(12) United States Patent
Goji et al.

(10) Patent No.: US 10,737,156 B2
(45) Date of Patent: Aug. 11, 2020

(54) GOLF CLUB GRIP AND GOLF CLUB

(71) Applicant: Sumitomo Rubber Industries, Ltd., Kobe-shi, Hyogo (JP)

(72) Inventors: Sho Goji, Kobe (JP); Kazuyoshi Shiga, Kobe (JP)

(73) Assignee: SUMITOMO RUBBER INDUSTRIES, LTD., Kobe-Shi, Hyogo (JP)

(*) Notice: Subject to any disclaimer, the term of this patent is extended or adjusted under 35 U.S.C. 154(b) by 38 days.

(21) Appl. No.: 16/174,881

(22) Filed: Oct. 30, 2018

(65) Prior Publication Data

US 2019/0126114 A1 May 2, 2019

(30) Foreign Application Priority Data

Oct. 31, 2017 (JP) .................. 2017-211096

(51) Int. Cl.
| | |
|---|---|
| *A63B 60/14* | (2015.01) |
| *A63B 60/08* | (2015.01) |
| *A63B 53/14* | (2015.01) |
| *A63B 53/00* | (2015.01) |
| *B29L 31/52* | (2006.01) |
| *B29C 33/42* | (2006.01) |

(52) U.S. Cl.
CPC .............. *A63B 60/14* (2015.10); *A63B 53/00* (2013.01); *A63B 53/14* (2013.01); *A63B 60/08* (2015.10); *A63B 2209/00* (2013.01); *B29C 33/424* (2013.01); *B29L 2031/5227* (2013.01)

(58) Field of Classification Search
None
See application file for complete search history.

(56) References Cited

U.S. PATENT DOCUMENTS

| | | | | |
|---|---|---|---|---|
| 4,552,713 A | * | 11/1985 | Cavicchioli | A63B 53/14 264/162 |
| 4,819,939 A | * | 4/1989 | Kobayashi | A63B 60/14 473/299 |
| 5,322,290 A | * | 6/1994 | Minami | A63B 53/14 473/201 |
| 5,634,859 A | * | 6/1997 | Nesbitt | A63B 53/14 473/301 |
| 5,772,524 A | * | 6/1998 | Huang | A63B 49/08 473/300 |

(Continued)

FOREIGN PATENT DOCUMENTS

| | | |
|---|---|---|
| JP | 2005-508769 A | 4/2005 |
| JP | 2016-214704 A | 12/2016 |

*Primary Examiner* — Peter A Salamon
(74) *Attorney, Agent, or Firm* — Birch, Stewart, Kolasch & Birch, LLP (57) ABSTRACT

An object of the present invention is to provide a golf club grip having good anti-slipping performance at hitting and improved head speed. The present invention provides a golf club grip comprising a cylindrical portion for inserting a shaft, wherein the cylindrical portion is formed from a rubber composition containing a base rubber and a crosslinking agent, the base rubber contains a nonpolar rubber in an amount of 50 mass % or more, and the cylindrical portion has a surface on which a plurality of minute projections having a height (h) of 0.07 mm or more and a minimum width (w1) at the bottom in a range from 0.2 mm to 0.8 mm are formed.

30 Claims, 5 Drawing Sheets

(56) References Cited

U.S. PATENT DOCUMENTS

| | | | | |
|---|---|---|---|---|
| 6,093,767 | A * | 7/2000 | Davis | C08L 21/00 |
| | | | | 428/1.33 |
| 6,610,382 | B1 * | 8/2003 | Kobe | A63B 49/08 |
| | | | | 428/119 |
| 2003/0088946 | A1 * | 5/2003 | Ferguson | A63B 53/14 |
| | | | | 16/431 |
| 2003/0090030 | A1 * | 5/2003 | Ferguson | B29C 33/3857 |
| | | | | 264/220 |
| 2004/0092329 | A1 * | 5/2004 | Meyer | A63B 53/10 |
| | | | | 473/316 |
| 2005/0148727 | A1 * | 7/2005 | Ajbani | C08L 53/005 |
| | | | | 525/63 |
| 2011/0165958 | A1 * | 7/2011 | Hachiro | A63B 53/14 |
| | | | | 473/300 |
| 2012/0129624 | A1 * | 5/2012 | Ito | A63B 53/14 |
| | | | | 473/303 |
| 2013/0096259 | A1 * | 4/2013 | Bette | C08L 75/04 |
| | | | | 525/185 |
| 2015/0322245 | A1 * | 11/2015 | Mikura | C08K 3/011 |
| | | | | 523/149 |
| 2016/0136492 | A1 * | 5/2016 | Mikura | A63B 60/08 |
| | | | | 473/300 |

* cited by examiner

GOLF CLUB GRIP AND GOLF CLUB

FIELD OF THE INVENTION

The present invention relates to a golf club grip.

DESCRIPTION OF THE RELATED ART

A golf club is composed of a shaft, a head provided on the front end of the shaft, and a grip into which the rear end of the shaft is inserted. The grip is a part where the golfer holds with his hand when he swings the golf club, and is a part playing a very important role in transmitting the golfer's motion to the golf club. Examples of the important performance required for the grip include slip resistance between the golfer's hand and the grip during the swing.

Figure 4:
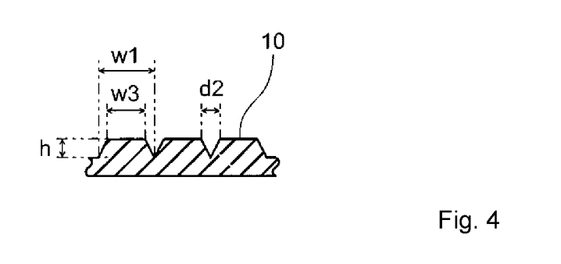
FIG. 4 is an A-A cross-sectional view of the minute projections shown in FIG. 3.

The grip is generally molded from a soft material such as a rubber or a synthetic resin, and further has a groove or dent pattern on the surface thereof for improving the anti-slipping performance thereof (for example, refer to paragraph 0035 and FIG. 4 of Japanese Patent Publication No. 2016-214704 A).

In addition, Japanese Patent Publication No. 2005-508769 A discloses a grip having a surface on which a stem array with stem zones each having different heights is formed (refer to paragraphs 0040 to 0043 of Japanese Patent Publication No. 2005-508769 A). In the grip disclosed in Japanese Patent Publication No. 2005-508769 A, stems with a height of about 0.020 to about 0.030 inch (0.508 mm to 0.762 mm) are formed on the first zone.

SUMMARY OF THE INVENTION

Japanese Patent Publication No. 2005-508769 A has proposed a method of forming minute projections on the grip surface for improving the anti-slipping performance of the grip. However, in the case of the minute projections, since the top of the projection enters inside the groove of the user's fingerprint, the user's sebum is easily attached to the minute projection. Further, in the case of the minute projections, it is necessary to make the shallow grooves between the projections for maintaining the strength of the projection. Thus, the user's sebum attached to the minute projection is retained on the grip surface, and the dryness of the grip surface tends to be lowered. If the dryness of the grip surface is lowered, the user feels slippery, and unconsciously would hold the grip tight, as a result of which, the head speed is lowered.

The present invention has been made in view of the abovementioned circumstances, and an object of the present invention is to provide a golf club grip having good anti-slipping performance at hitting and providing higher head speed.

The golf club grip according to the present invention that has solved the above problem comprises a cylindrical portion for inserting a shaft, wherein the cylindrical portion is formed from a rubber composition containing a base rubber and a crosslinking agent, the base rubber contains a nonpolar rubber in an amount of 50 mass % or more, and the cylindrical portion has a surface on which a plurality of minute projections having a height (h) of 0.07 mm or more and a minimum width (w1) at the bottom of the projection in a range from 0.2 mm to 0.8 mm are formed.

The grip primarily contains a nonpolar rubber and can absorb the user's sebum attached to the minute projection, thereby keeping the grip surface dry. Further, when the user holds the grip, the minute projection can enter inside the groove of the user's fingerprint. As a result, the minute projection exerts an anchor effect inside the groove of the user's fingerprint, and thus the anti-slipping performance is improved. In addition, the minute projection entering inside the groove of the fingerprint moves together with the fingerprint, and thus the user feels less slippery. Thus, the user unconsciously holds the grip weak, and the resistance of the body against the swing becomes low, as a result of which, the head speed is improved.

The present invention also provides a golf club comprising a shaft, a head provided on one end of the shaft, and a grip provided on another end of the shaft, wherein the grip is the above-described golf club grip.

According to the present invention, a golf club grip having good anti-slipping performance at hitting and providing higher head speed is obtained.

DESCRIPTION OF THE PREFERRED EMBODIMENT

The present invention provides a golf club grip comprising a cylindrical portion for inserting a shaft, wherein the cylindrical portion is formed from a rubber composition containing a base rubber and a crosslinking agent, the base rubber contains a nonpolar rubber in an amount of 50 mass % or more, and the cylindrical portion has a surface on which a plurality of minute projections having a height (h) of 0.07 mm or more and a minimum width (w1) at the bottom of the projection in a range from 0.2 mm to 0.8 mm are formed.

[Minute Projection]

The minute projection has a height of 0.07 mm or more and a minimum width at the bottom of the projection in a range from 0.2 mm to 0.8 mm. If the height of the minute projection and the minimum width at the bottom of the minute projection fall within the above range, the minute projection enters inside the groove of the user's fingerprint when the user holds the grip. As a result, the minute projection exerts an anchor effect inside the groove of the user's fingerprint and thus the anti-slipping performance is improved.

Further, if the minute projection enters inside the groove of the user's fingerprint, the user feels less slippery. The mechanism is considered as follows. Two rows of meissner corpuscles are disposed directly under the fingerprint. These meissner corpuscles detect shearing deformation generated in the fingerprint and release of the shearing deformation, thereby detecting the slipping of the fingerprint contact surface. Here, since the minute projection entering inside the groove of the fingerprint moves together with the fingerprint, the fingerprint is hardly released from the shearing deformation. In other words, the meissner corpuscles hardly detect the slipping. Thus, the grip comprising minute projections makes the user feel less slippery. If the user feels less slippery, the user unconsciously holds the grip weak. If the force holding the grip becomes weak, the resistance of the body against the swing becomes low and thus the head speed is improved.

Figure 1:
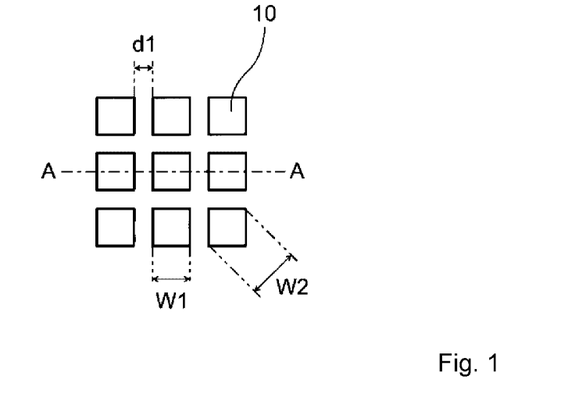
FIG. 1 is a plane view showing one example of minute projections.
Figure 2:
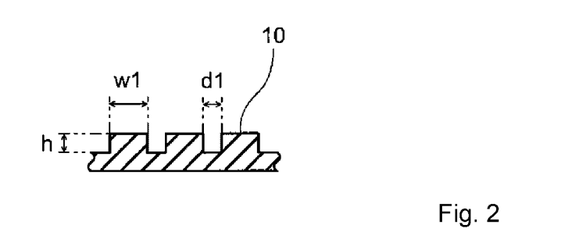
FIG. 2 is an A-A cross-sectional view of the minute projections shown in FIG. 1.
Figure 3:
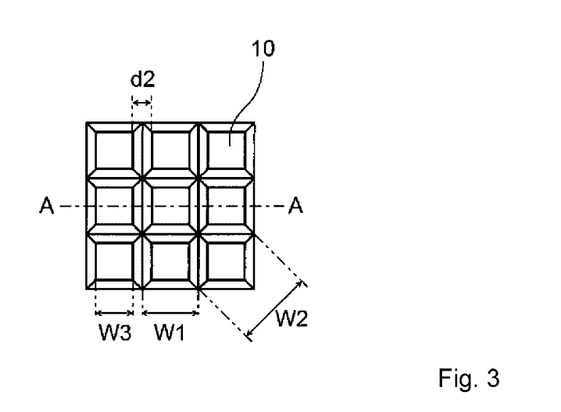
FIG. 3 is a plane view showing another example of minute projections.
Figure 5:
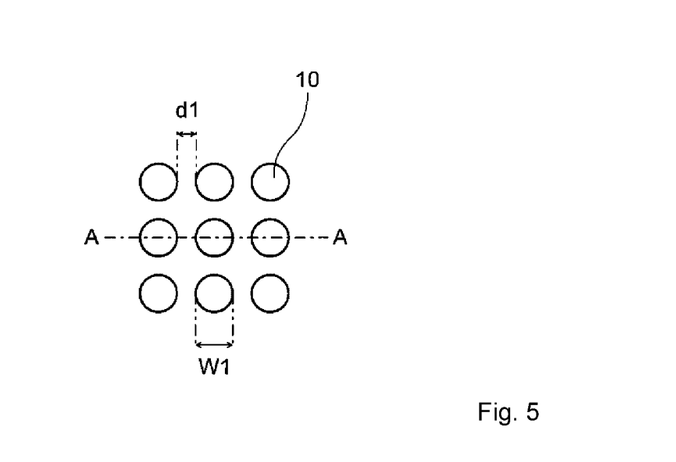
FIG. 5 is a plane view showing another example of minute projections.
Figure 6:
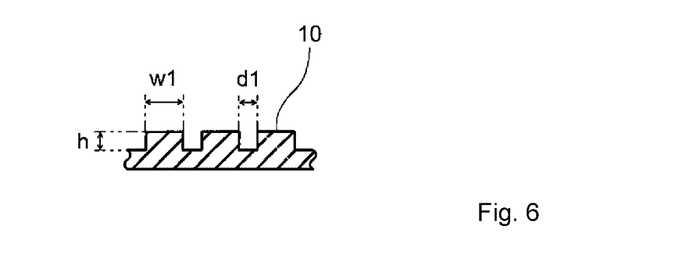
FIG. 6 is an A-A cross-sectional view of the minute projections shown in FIG. 5.
Figure 7:
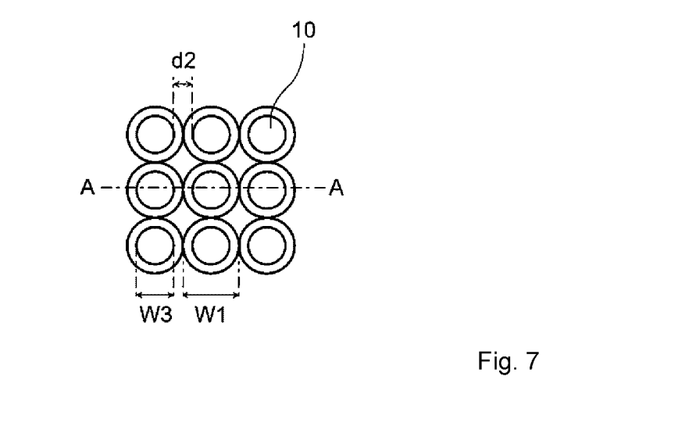
FIG. 7 is a plane view showing another example of minute projections.
Figure 8:
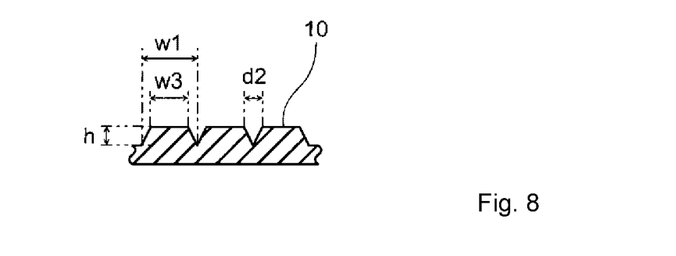
FIG. 8 is an A-A cross-sectional view of the minute projections shown in FIG. 7.

The height and the width of the minute projection will be explained with reference to FIGS. 1 to 8. FIG. 1 is a plane view showing one example of minute projections. FIG. 2 is an A-A cross-sectional view of the minute projections shown in FIG. 1. FIGS. 3, 5 and 7 are plane views showing other examples of minute projections. FIGS. 4, 6 and 8 are A-A cross-sectional views of the minute projections shown in FIGS. 3, 5 and 7, respectively. The plane view shape of the bottom of the minute projections shown in FIGS. 1, 2 is a quadrangle (square), and the three-dimensional shape of the minute projections shown in FIGS. 1, 2 is a quadrangular prism. The plane view shape of the bottom of the minute projections shown in FIGS. 3, 4 is a quadrangle (square), and the three-dimensional shape of the minute projections shown in FIGS. 3, 4 is a quadrangular truncated pyramid. The plane view shape of the bottom of the minute projections shown in FIGS. 5, 6 is a circle, and the three-dimensional shape of the minute projections shown in FIGS. 5, 6 is a column. The plane view shape of the bottom of the minute projections shown in FIGS. 7, 8 is a circle, and the three-dimensional shape of the minute projections shown in FIGS. 7, 8 is a truncated cone.

The height of the minute projection is a distance (h) from the top to the bottom of the minute projection in the normal direction of the cylindrical portion surface. The height (h) of the minute projection is preferably 0.07 mm or more, more preferably 0.08 mm or more, and even more preferably 0.09 mm or more, and is preferably 1.5 mm or less, more preferably 0.8 mm or less, and even more preferably 0.3 mm or less. If the height of the minute projection is 0.07 mm or more, sufficient clutching is obtained when contacting the fingerprint and thus the anti-slipping performance is further enhanced, and if the height of the minute projection is 1.5 mm or less, the minute projection does not fall down when being held and thus the anti-slipping performance is obtained.

The minimum width (w1) at the bottom of the minute projection is a minimum value of the width at the bottom of the minute projection. The minimum width (w1) at the bottom of the minute projection is 0.2 mm or more, preferably 0.3 mm or more, and even more preferably 0.4 mm or more, and is 0.8 mm or less, more preferably 0.6 mm or less, and even more preferably 0.5 mm or less. If the minimum width of the bottom is 0.2 mm or more, the minute projection easily enters inside the groove of the fingerprint and thus the anti-slipping performance is greater, and if the minimum width of the bottom is 0.8 mm or less, the minute projection does not protrude from the fingerprint and thus the touch feeling is better.

The ratio (h/w1) of the height (h) to the minimum width (w1) of the bottom of the minute projection is preferably 0.10 or more, more preferably 0.13 or more, and even more preferably 0.16 or more, and is preferably 1.5 or less, more preferably 1.0 or less, and even more preferably 0.5 or less. If the ratio (h/w1) is 0.10 or more, the minute projection has enough size with respect to the fingerprint and thus the anti-slipping performance is further enhanced, and if the ratio (h/w1) is 1.5 or less, the minute projection does not fall down when holding the grip and thus the anti-slipping performance is obtained.

The plane view shape of the bottom of the minute projection is not particularly limited, and examples thereof include a polygon such as a triangle, quadrangle, pentagon and hexagon, a round-cornered polygon, a circle, an ellipse, a cross, and a star-shaped polygon. Among them, the polygon such as triangle, quadrangle, pentagon and hexagon, the circle and the ellipse are preferred in view of the mechanical strength of the minute projection.

When the plane view shape of the bottom of the minute projection is a shape other than a circle, the maximum width (w2) of the bottom is 0.2 mm or more, preferably 0.3 mm or more, and even more preferably 0.4 mm or more, and is 1.2 mm or less, preferably 1.0 mm or less, and even more preferably 0.8 mm or less. If the maximum width of the bottom is 0.2 mm or more, the mechanical strength of the minute projection is greater, and if the maximum width of the bottom is 1.2 mm or less, the number of the minute projection per unit area can be increased and thus the anti-slipping performance is enhanced.

The ratio (w2/w1) of the maximum width (w2) to the minimum width (w1) of the bottom is preferably 1.40 or less, more preferably 1.35 or less, and even more preferably 1.30 or less. If the ratio (w2/w1) is 1.40 or less, the number of the minute projections per unit area can be increased and thus the anti-slipping performance is enhanced. The lower limit of the ratio (w2/w1) is 1.00.

The three-dimensional shape of the minute projection is not particularly limited, and examples thereof include a cylinder or prism such as a triangular prism, quadrangular prism, pentagonal prism, hexagonal prism, cylinder and elliptic cylinder; a frustum such as a triangular truncated pyramid, quadrangular truncated pyramid, pentagonal truncated pyramid, hexagonal truncated pyramid, truncated cone and elliptic truncated cone; and a pyramid or cone such as a triangular pyramid, quadrangular pyramid, pentagonal pyramid, hexagonal pyramid and cone. Among them, the cylinder or prism, and the frustum are preferred.

When the three-dimensional shape of the minute projection is the frustum, the ratio (w3/w1) of the minimum width (w3) of the upper base to the minimum width of the lower base (w1) (minimum width of the bottom) is preferably 0.3 or more, more preferably 0.5 or more, and even more preferably 0.7 or more. If the ratio (w3/w1) is 0.3 or more, the mechanical strength of the minute projection is greater and thus the durability is enhanced. The ratio (w3/w1) is less than 1.0. It is noted that the lower base of the frustum is the bottom of the minute projection.

A plurality of the minute projections are arranged on the surface of the cylindrical portion. The arrangement of these minute projections is not particularly limited, and examples thereof include a grid arrangement, a staggered arrangement and a random arrangement. In addition, a plurality of the minute projections may all have the same shape, or have two or more shapes.

When the three-dimensional shape of the minute projection is the cylinder or prism, the shortest distance (d1) between the bottoms of the adjacent minute projections is preferably 0.10 mm or more, more preferably 0.15 mm or more, and even more preferably 0.20 mm or more, and is preferably 0.5 mm or less, more preferably 0.4 mm or less, and even more preferably 0.3 mm or less. If the shortest distance (d1) between the bottoms is 0.10 mm or more, it is possible to perform the processing by the laser engraving in a good precision, and if the shortest distance (d1) between the bottoms is 0.5 mm or less, the fingerprint easily catches the minute projection.

When the three-dimensional shape of the minute projection is the frustum, the shortest distance (d2) between the upper bases of the adjacent minute projections is preferably 0.10 mm or more, more preferably 0.15 mm or more, and even more preferably 0.20 mm or more, and is preferably 0.5 mm or less, more preferably 0.4 mm or less, and even more preferably 0.3 mm or less. If the shortest distance (d2) between the upper bases is 0.10 mm or more, it is possible to perform the processing by the laser engraving in a good precision, and if the shortest distance (d2) between the upper bases is 0.5 mm or less, the fingerprint easily catches the minute projection. It is noted that when the three-dimensional shape of the minute projection is the frustum, the lower bases of the adjacent minute projections may mutually contact or apart from each other.

The number of the minute projection is not particularly limited and may be appropriately adjusted according to the shape of each minute projection. It is noted that the cylindrical portion preferably comprises a minute projection existence region where the minute projections exist in an amount of 150 to 2500 per cm$^2$. The number of the minute projections per cm$^2$ of the minute projection existence region is preferably 250 or more, more preferably 300 or more, and is preferably 2000 or less, more preferably 1500 or less.

The area ratio of the minute projection existence region in the surface area of the region having a distance of 10% to 60% of the total length from the tip side end along the axis direction of the cylindrical portion is preferably 50 area % or more, more preferably 70 area % or more, and even more preferably 90 area % or more. Further, it is also preferred that the entire region having the distance of 10% to 60% of the total length from the tip side end along the axis direction of the cylindrical portion is the minute projection existence region. The region having the distance of 10% to 60% of the total length from the tip side end along the axis direction of the cylindrical portion is the part where the user holds the grip with his hand. If the minute projection existence region exists in this part, the grip has better touch feeling.

The area ratio of the minute projection existence region in the total surface area of the cylindrical portion is preferably 40 area % or more, more preferably 45 area % or more, and even more preferably 50 area % or more, and is preferably 100 area % or less, more preferably 80 area % or less, and even more preferably 60 area % or less.

The minute projection is preferably formed by a laser processing. If the laser processing is used, the minute projection can be easily formed. In particular, if the laser processing is used, a cylindrical or prismatic minute projection, or a frustum having a ratio (w3/w1) of 0.3 or more can be formed. It is noted that if a processing using a mold is used to form the minute projection, a cylindrical or prismatic minute projection, or a frustum having a ratio (w3/w1) of 0.3 or more is hardly formed in a good precision.

[Construction]

The cylindrical portion of the golf club grip may be either a single layered construction or a multiple layered construction. In the case that the cylindrical portion has a single layered construction, the minute projection existence region and the other region than the minute projection existence region (hereinafter sometimes simply referred to as "other region") may be formed from different compositions or the same composition. It is noted that the minute projection existence region and the other region of the single layered cylindrical portion are preferably both a solid layer.

In the case that the cylindrical portion has a multiple layered construction, the cylindrical portion comprises an outermost surface layer and at least one inner layer, wherein the outermost surface layer has the minute projection existence region. Herein, the outermost surface layer means an outermost layer of the grip, i.e. a portion touched by the user when using the grip. The minute projection existence region and the other region of the outermost surface layer may be formed from different compositions or the same composition. It is noted that the minute projection existence region and the other region of the outermost surface layer are preferably both a solid layer. It is preferred that at least one layer of the inner layer is a porous layer. In the case that the cylindrical portion has a multiple layered construction, the cylindrical portion is preferably a dual layered construction composed of an outermost surface layer and one inner layer; or an triple layered construction composed of an outermost surface layer and two inner layers.

The thickness of the cylindrical portion is preferably 0.5 mm or more, more preferably 1.0 mm or more, and even more preferably 1.5 mm or more, and is preferably 17.0 mm or less, more preferably 10.0 mm or less, and even more preferably 8.0 mm or less. The cylindrical portion may be formed with a fixed thickness along the axis direction thereof, or may be formed with a thickness gradually becoming thicker from the front end toward the back end.

When the cylindrical portion has a thickness in a range from 0.5 mm to 17.0 mm, the thickness of the outermost surface layer is preferably 0.5 mm or more, more preferably 0.6 mm or more, and even more preferably 0.7 mm or more, and is preferably 2.5 mm or less, more preferably 2.3 mm or less, and even more preferably 2.1 mm or less. If the thickness of the outermost surface layer is 0.5 mm or more, the reinforcing effect by the outer layer material becomes greater, and if the thickness of the outer layer is 2.5 mm or less, the inner layer can be relatively thickened and thus the effect of reducing the weight of the grip becomes greater.

The percentage ((thickness of outermost surface layer/thickness of cylindrical portion)×100) of the thickness of the outermost surface layer to the thickness of the cylindrical portion is preferably 0.5% or more, more preferably 1.0% or more, and even more preferably 1.5% or more, and is preferably 99.0% or less, more preferably 98.0% or less, and even more preferably 97.0% or less. If the above percentage is 0.5% or more, the reinforcing effect by the outer layer material becomes greater, and if the above percentage is 99.0% or less, the inner layer can be relatively thickened and thus the effect of reducing the weight of the grip becomes greater.

[Material]

At least the part of the cylindrical portion on which the minute projections are formed, is formed from the rubber composition containing the base rubber and the crosslinking agent, wherein the amount of the nonpolar rubber in the base rubber is 50 mass % or more. If the amount of the nonpolar rubber in the base rubber is 50 mass % or more, the grip can absorb oil components even if the user's sebum is attached to the minute projections entering inside the user's fingerprint. Thus, lowering in the anti-slipping performance due to the user's sebum can be inhibited. Hereinafter, the rubber composition constituting the minute projection existence region is sometimes referred to as the first rubber composition.

The amount of the nonpolar rubber in the base rubber of the first rubber composition is 50 mass % or more, preferably 60 mass % or more, and even more preferably 70 mass % or more. The base rubber of the first rubber composition may further contain a polar rubber but preferably consists of the nonpolar rubber. The nonpolar rubber has a SP (solubility parameter) value of 7.7 or more and less than 8.7.

The SP value is a value ($Pa^{1/2}$ (25° C.)) calculated according to the Fedors' formula (the following mathematical formula (1)) (Page 147, Issue 2, Volume 14, Polymer Engineering and Science, 1974).

$$SP \text{ value} = (\Delta E/V)^{1/2} = (\Sigma \Delta ei / \Sigma \Delta vi)^{1/2} \quad (1)$$

[In the formula (1), $\Delta E$ represents evaporation energy, V represents mole volume, $\Delta ei$ represents evaporation energy of atom or atomic group, and $\Delta vi$ represents mole volume of atom or atomic group.]

Examples of the nonpolar rubber include a diene rubber such as isoprene rubber (IR), butadiene rubber (BR), styrene-butadiene rubber (SBR), chloroprene rubber (CR) and natural rubber (NR); and a non-diene rubber such as ethylene-propylene rubber (EPM), ethylene-propylene-diene rubber (EPDM) and butyl rubber (IIR). The nonpolar rubber may be used solely, or two or more of them may be used in combination. Among them, the diene rubber is preferred, and the amount of the diene rubber in the nonpolar rubber is preferably 50 mass % or more, more preferably 60 mass % or more. It is also preferred that the nonpolar rubber consists of the diene rubber. As the nonpolar rubber, NR, EPDM, IIR and SBR are more preferred.

The first rubber composition preferably contains a natural rubber as the base rubber. If the natural rubber is contained, the flexibility of the minute projections is maintained even under a cold condition, and thus high anti-slipping performance can be maintained. When the natural rubber is used as the base rubber, the amount of the natural rubber in the base rubber is preferably 50 mass % or more, more preferably 55 mass % or more, and even more preferably 60 mass % or more.

The first rubber composition may contain a polar rubber as the base rubber. The polar rubber has a SP value of 8.7 or more and 10.5 or less. Examples of the polar rubber include a diene rubber such as acrylonitrile-butadiene rubber (NBR), carboxy-modified acrylonitrile-butadiene rubber (XNBR), hydrogenated acrylonitrile-butadiene rubber (HNBR) and hydrogenated carboxy-modified acrylonitrile-butadiene rubber (HXNBR); and a non-diene rubber such as acrylic rubber and urethane rubber.

As the crosslinking agent, a sulfur based crosslinking agent and an organic peroxide may be used. Examples of the sulfur based crosslinking agent include an elemental sulfur and a sulfur donor type compound. Examples of the elemental sulfur include powdery sulfur, precipitated sulfur, colloidal sulfur, and insoluble sulfur. Examples of the sulfur donor type compound include 4,4'-dithiobismorpholine. Examples of the organic peroxide include dicumyl peroxide, α,α'-bis (t-butylperoxy-m-diisopropyl) benzene, 2,5-dimethyl-2,5-di (t-butylperoxy) hexane, and 1,1-bis(t-butylperoxy)-3,3,5-trimethylcyclohexane. The crosslinking agent may be used solely, or two or more of them may be used in combination. As the crosslinking agent, the sulfur based crosslinking agent is preferred, and the elemental sulfur is more preferred. The amount of the crosslinking agent is preferably 0.2 part by mass or more, more preferably 0.4 part by mass or more, and even more preferably 0.6 part by mass or more, and is preferably 4.0 parts by mass or less, more preferably 3.5 parts by mass or less, and even more preferably 3.0 parts by mass or less, with respect to 100 parts by mass of the base rubber.

The first rubber composition preferably contains at least one oil absorbent selected from the group consisting of carbon black having a DBP (dibutyl phthalate) absorption amount in a range from 50 to 150, silica having a DBP absorption amount in a range from 100 to 400, titanium oxide having a DBP absorption amount in a range from 10 to 30 and calcined kaolin having a DBP absorption amount in a range from 50 to 100. If the first rubber composition contains the oil absorbent, the grip has enhanced oil absorption performance. Thus, lowering in the anti-slipping performance due to the user's sebum is further inhibited. The oil absorbent may be used solely, or two or more of them may be used in combination. The DBP absorption amount of these materials is measured according to JIS K6217-4 (2008) by using a compressed sample. The DBP absorption amount shows an ability of absorbing the oil (dibutyl phthalate).

In the case that the oil absorbent is blended, the amount of the oil absorbent is preferably 4 parts by mass or more, more preferably 6 parts by mass or more, and even more preferably 8 parts by mass or more, and is preferably 20 parts by mass or less, more preferably 16 parts by mass or less, and even more preferably 14 parts by mass or less, with respect to 100 parts by mass of the base rubber. If the amount of the oil absorbent is 4 parts by mass or more, sufficient oil absorption performance is obtained, and if the amount of the oil absorbent is 20 parts by mass or less, the weight of the grip does not become excessively heavy.

The product (amount x DBP absorption amount) obtained by multiplying the amount (g) of the oil absorbent in the first rubber composition with respect to 100 g of the base rubber by the DBP absorption amount ($cm^3/100$ g) is preferably 200 or more, more preferably 400 or more, and even more preferably 800 or more, and is preferably 8000 or less, more preferably 7000 or less, and even more preferably 6000 or less. If the product (amount x DBP absorption amount) is 200 or more, sufficient sebum endurance is obtained, and if the product (amount x DBP absorption amount) is 8000 or less, the rubber composition does not become excessively hard.

The DBP absorption amount of the carbon black is preferably 50 $cm^3/100$ g or more, more preferably 60 $cm^3/100$ g or more, and even more preferably 70 $cm^3/100$ g or more, and is preferably 150 $cm^3/100$ g or less, more preferably 145 $cm^3/100$ g or less, and even more preferably 140 $cm^3/100$ g or less.

In the case that the carbon black is blended, the amount of the carbon black is preferably 2 parts by mass or more, more preferably 3 parts by mass or more, and even more preferably 4 parts by mass or more, and is preferably 20 parts by mass or less, more preferably 16 parts by mass or less, and even more preferably 14 parts by mass or less, with respect to 100 parts by mass of the base rubber.

The DBP absorption amount of the silica is preferably 100 $cm^3/100$ g or more, more preferably 140 $cm^3/100$ g or more, and even more preferably 160 $cm^3/100$ g or more, and is preferably 400 cm³/100 g or less, more preferably 380 cm³/100 g or less, and even more preferably 360 cm³/100 g or less.

In the case that the silica is blended, the amount of the silica is preferably 2 parts by mass or more, more preferably 4 parts by mass or more, and even more preferably 6 parts by mass or more, and is preferably 20 parts by mass or less, more preferably 16 parts by mass or less, and even more preferably 14 parts by mass or less, with respect to 100 parts by mass of the base rubber.

The DBP absorption amount of the titanium oxide is preferably 10 cm³/100 g or more, more preferably 12 cm³/100 g or more, and even more preferably 15 cm³/100 g or more, and is preferably 30 cm³/100 g or less, more preferably 27 cm³/100 g or less, and even more preferably 26 cm³/100 g or less.

In the case that the titanium oxide is blended, the amount of the titanium oxide is preferably 2 parts by mass or more, more preferably 4 parts by mass or more, and even more preferably 6 parts by mass or more, and is preferably 10 parts by mass or less, more preferably 9 parts by mass or less, and even more preferably 8 parts by mass or less, with respect to 100 parts by mass of the base rubber.

The DBP absorption amount of the calcined kaolin is preferably 50 cm³/100 g or more, more preferably 55 cm³/100 g or more, and even more preferably 60 cm³/100 g or more, and is preferably 100 cm³/100 g or less, more preferably 95 cm³/100 g or less, and even more preferably 90 cm³/100 g or less.

In the case that the calcined kaolin is blended, the amount of the calcined kaolin is preferably 2 parts by mass or more, more preferably 4 parts by mass or more, and even more preferably 6 parts by mass or more, and is preferably 20 parts by mass or less, more preferably 16 parts by mass or less, and even more preferably 14 parts by mass or less, with respect to 100 parts by mass of the base rubber.

The first rubber composition preferably further contains a vulcanization accelerator or a vulcanization activator.

Examples of the vulcanization accelerator include thiurams such as tetramethylthiuram disulfide (TMTD), tetrabenzylthiuram disulfide (TBzTD), tetramethylthiuram monosulfide (TMTM), and dipentamethylenethiuram tetrasulfide; guanidines such as diphenylguanidine (DPG); dithiocarbamates such as zinc dimethyldithiocarbamate (Zn-PDC), and zinc dibutyldithiocarbamate; thioureas such as trimethylthiourea, and N,N'-diethylthiourea; thiazoles such as mercaptobenzothiazole (MBT), and benzothiazole disulfide; and sulfenamides such as N-cyclohexyl-2-benzothiazolylsulfenamide (CBS), and N-t-butyl-2-benzothiazolylsulfenamide (BBS). These vulcanization accelerators may be used solely, or two or more of them may be used in combination. The total amount of the vulcanization accelerator is preferably 0.4 part by mass or more, more preferably 0.8 part by mass or more, and even more preferably 1.2 parts by mass or more, and is preferably 8.0 parts by mass or less, more preferably 7.0 parts by mass or less, and even more preferably 6.0 parts by mass or less, with respect to 100 parts by mass of the base rubber.

Examples of the vulcanization activator include a metal oxide (titanium oxide is excluded), a metal peroxide, and a fatty acid. Examples of the metal oxide include zinc oxide, magnesium oxide, and lead oxide. Examples of the metal peroxide include zinc peroxide, chromium peroxide, magnesium peroxide, and calcium peroxide. Examples of the fatty acid include stearic acid, oleic acid, and palmitic acid. These vulcanization activators may be used solely, or two or more of them may be used in combination. The total amount of the vulcanization activator is preferably 0.5 part by mass or more, more preferably 0.6 part by mass or more, and even more preferably 0.7 part by mass or more, and is preferably 10.0 parts by mass or less, more preferably 9.5 parts by mass or less, and even more preferably 9.0 parts by mass or less, with respect to 100 parts by mass of the base rubber.

The first rubber composition may further contain an antioxidant, softening agent, coloring agent, antiscorching agent, resin or the like, where necessary.

Examples of the antioxidant include imidazoles, amines, phenols and thioureas. Examples of the imidazoles include nickel dibutyldithiocarbamate (NDIBC), 2-mercaptobenzimidazole, and zinc salt of 2-mercaptobenzimidazole. Examples of the amines include phenyl-α-naphtylamine. Examples of the phenols include 2,2'-methylene bis(4-methyl-6-t-butylphenol) (MBMBP), and 2,6-di-tert-butyl-4-methylphenol. Examples of the thioureas include tributyl thiourea, and 1,3-bis(dimethylaminopropyl)-2-thiourea. These antioxidants may be used solely, or two or more of them may be used in combination. The amount of the antioxidant is preferably 0.2 part by mass or more, more preferably 0.3 part by mass or more, and even more preferably 0.4 part by mass or more, and is preferably 5.0 parts by mass or less, more preferably 4.8 parts by mass or less, and even more preferably 4.6 parts by mass or less, with respect to 100 parts by mass of the base rubber.

Examples of the softening agent include a mineral oil and a plasticizer. Examples of the mineral oil include paraffin oil, naphthene oil, and aromatic oil. Examples of the plasticizer include dioctyl phthalate, dibutyl phthalate, dioctyl sebacate, and dioctyl adipate.

Examples of the antiscorching agent include an organic acid and a nitroso compound. Examples of the organic acid include phthalic anhydride, pyromellitic anhydride, trimellitic anhydride, benzoic acid, salicylic acid, and malic acid. Examples of the nitroso compound include N-nitrosodiphenylamine, N-(cyclohexylthio) phthalimide, sulfonamide derivative, diphenyl urea, bis(tridecyl)pentaerythritol diphosphite, and 2-mercaptobenzimidazole.

Examples of the resin include a hydrogenated rosin ester, disproportionated rosin ester, ethylene-vinyl acetate copolymer, coumarone resin, phenol resin, xylene resin, and styrene resin.

The first rubber composition may be prepared by a conventionally known method, for example, by kneading raw materials with a kneading machine such as a banbury mixer, a kneader, and an open roll.

The material hardness (Shore A hardness) of the first rubber composition is preferably 40 or more, more preferably 42 or more, and even more preferably 45 or more, and is preferably 60 or less, more preferably 58 or less, and even more preferably 55 or less. If the material hardness (Shore A hardness) of the surface layer rubber composition is 40 or more, the mechanical strength of the minute projection existence region is further enhanced, and if the material hardness (Shore A hardness) of the surface layer rubber composition is 60 or less, the outermost surface layer does not become excessively hard and thus the grip feeling when holding the grip becomes better.

In the single layered cylindrical portion or the outermost surface layer of the multiple layered cylindrical portion, the material for forming the other region than the minute projection existence region is not particularly limited, but the material is preferably the first rubber composition. It is noted that the rubber composition constituting the other region may be identical to or different from the rubber composition constituting the minute projection existence region. If these rubber compositions are identical to each other, production of the cylindrical portion or the outermost surface layer becomes easier.

In the case that the cylindrical portion has a multiple layered construction, the material for forming the inner layer is not particularly limited. Examples of the composition for forming the inner layer (hereinafter sometimes referred to as "second composition") include a second rubber composition and a resin composition.

The second rubber composition preferably contains a base rubber and a crosslinking agent. Examples of the base rubber include natural rubber (NR), ethylene-propylene-diene rubber (EPDM), butyl rubber (IIR), acrylonitrile-butadiene rubber (NBR), hydrogenated acrylonitrile-butadiene rubber (HNBR), carboxyl-modified acrylonitrile-butadiene rubber (XNBR), carboxyl-modified hydrogenated acrylonitrile-butadiene rubber (HXNBR), butadiene rubber (BR), styrene-butadiene rubber (SBR), polyurethane rubber (PU), isoprene rubber (IR), chloroprene rubber (CR), and ethylene-propylene rubber (EPM). Among them, NR, EPDM, IIR, NBR, HNBR, XNBR, HXNBR, BR, SBR, and PU are preferred as the base rubber.

Examples of the crosslinking agent used in the second rubber composition include the same one as those employed in first rubber composition, and the elemental sulfur is preferred. The second rubber composition preferably further contains a vulcanization accelerator and a vulcanization activator. Examples of these vulcanization accelerator and vulcanization activator include the same one as those employed in the first rubber composition. As the vulcanization accelerator, N-t-butyl-2-benzothiazolylsulfenamide and tetrabenzylthiuram disulfide are preferred. As the vulcanization activator, zinc oxide and stearic acid are preferred.

The second rubber composition may further contain a reinforcing material, antioxidant, softening agent, coloring agent, antiscorching agent and the like, where necessary. Examples of the reinforcing material, antioxidant and coloring agent include the same one as those employed in the first rubber composition. As the reinforcing material, carbon black and silica are preferred. As the antioxidant, 2,2'-methylene bis(4-methyl-6-t-butylphenol) is preferred.

The second rubber composition may be prepared by a conventionally known method, for example, by kneading raw materials with a kneading machine such as a banbury mixer, a kneader, and an open roll. The temperature (material temperature) when performing the kneading preferably ranges from 70° C. to 160° C. It is noted that when the second rubber composition contains microballoons, the kneading is preferably performed at a temperature lower than the expansion starting temperature of the microballoons.

The resin composition contains a base resin. Examples of the base resin include a polyurethane resin, polystyrene resin, polyethylene resin, polypropylene resin, ethylene-vinyl acetate copolymer resin, and polyethylene terephthalate resin.

The second composition for forming the other portion is preferably the second rubber composition, and preferably contains natural rubber (NR), ethylene-propylene-diene rubber (EPDM) or butyl rubber (IIR) as the base rubber. If the composition for forming the other portion contains natural rubber (NR), ethylene-propylene-diene rubber (EPDM) or butyl rubber (IIR), adhesion between the portion formed from the first rubber composition and the other portion is enhanced.

The inner layer may be a solid layer or a porous layer. If the inner layer is a porous layer, the golf club grip has a light weight. The porous layer is a layer having numerous fine pores (voids) formed in a rubber that is a base material. If numerous fine pores are formed therein, the inner layer has a small apparent density, and thus has a light weight.

Examples of the method for preparing the porous layer include a balloon foaming method, chemical foaming method, supercritical carbon dioxide injection molding method, salt extraction method, and solvent removing method. In the balloon foaming method, microballoons are allowed to be included in the rubber composition, and then be expanded by heating to perform foaming. In addition, expanded microballoons may be blended in the rubber composition, and then the resultant rubber composition is molded. In the chemical foaming method, a foaming agent (such as azodicarbonamide, azobisisobutyronitrile, N,N'-dinitrosopentamethylene tetramine, p-toluenesulfonyl hydrazine, and p-oxybis(benzenesulfono hydrazide)) or a foaming auxiliary is allowed to be included in the rubber composition, and then a gas (such as carbon dioxide gas and nitrogen gas) is generated by a chemical reaction to perform foaming. In the supercritical carbon dioxide injection molding method, the rubber composition is immersed in carbon dioxide being in a supercritical state at a high pressure, the resultant rubber composition is injected at a normal pressure, and carbon dioxide is gasified to perform foaming. In the salt extraction method, a soluble salt (such as boric acid and calcium chloride) is allowed to be included in the rubber composition, and then the salt is dissolved and extracted therefrom after molding to form fine pores. In the solvent removing method, a solvent is allowed to be included in the rubber composition, and then the solvent is removed therefrom after molding to form fine pores.

When the inner layer is a porous layer, it is preferably a foamed layer formed from the second rubber composition containing a foaming agent. In particular, it is preferably a foamed layer prepared by the balloon foaming method. In other words, the inner layer is preferably a foamed layer formed from the second rubber composition containing microballoons. If the microballoons are used, the inner layer has a light weight while maintaining the mechanical strength thereof.

As the microballoons, either organic microballoons or inorganic microballoons may be used. Examples of the organic microballoons include hollow particles formed from a thermoplastic resin, and resin capsules encapsulating a hydrocarbon with a low boiling point in a shell formed from a thermoplastic resin. Specific examples of the resin capsules include Expancel available from Akzo Nobel Company, and Matsumoto Microsphere (registered trademark) available from Matsumoto Yushi Seiyaku Co., Ltd. Examples of the inorganic microballoons include hollow glass particles (such as silica balloons and alumina balloons), and hollow ceramic particles.

The volume average particle size of the resin capsules (before expansion) is preferably 5 μm or more, more preferably 6 μm or more, and even more preferably 9 μm or more, and is preferably 90 μm or less, more preferably 70 μm or less, and even more preferably 60 μm or less.

When the inner layer is prepared by the balloon foaming method, the amount of the microballoons in the second rubber composition is preferably 5 parts by mass or more, more preferably 8 parts by mass or more, and even more preferably 12 parts by mass or more, and is preferably 20 parts by mass or less, more preferably 18 parts by mass or less, and even more preferably 15 parts by mass or less, with respect to 100 parts by mass of the base rubber. If the amount of the microballoons is 5 parts by mass or more, the effect of reducing the weight of the grip becomes greater, and if the amount of the microballoons is 20 parts by mass or less, lowering in the mechanical strength of the inner layer can be suppressed.

In addition, the foaming ratio of the inner layer prepared by the balloon foaming method is preferably 1.2 or more, more preferably 1.5 or more, and even more preferably 1.8 or more, and is preferably 5.0 or less, more preferably 4.5 or less, and even more preferably 4.0 or less. If the foaming ratio is 1.2 or more, the effect of reducing the weight of the grip becomes greater, and if the foaming ratio is 5.0 or less, lowering in the mechanical strength of the inner layer can be suppressed.

The material hardness (Shore A hardness) of the second rubber composition is preferably 20 or more, more preferably 25 or more, and even more preferably 30 or more, and is preferably 60 or less, more preferably 58 or less, and even more preferably 55 or less. If the material hardness (Shore A hardness) of the inner layer rubber composition is 20 or more, the inner layer does not become excessively soft and thus a tightly fixed touch feeling when holding the grip is obtained, and if the material hardness (Shore A hardness) of the inner layer rubber composition is 60 or less, the inner layer does not become excessively hard and thus the grip feeling when holding the grip becomes better.

The golf club grip may be obtained by molding the first rubber composition in a mold. Examples of the molding method include a press molding method and an injection molding method. In addition, the golf club grip comprising an inner layer and an outer layer may be obtained, for example, by press molding a laminated product composed of an unvulcanized rubber sheet formed from the first rubber composition and an unvulcanized rubber sheet formed from the second rubber composition in a mold. When the press molding method is adopted, the temperature of the mold preferably ranges from 140° C. to 200° C., the molding time preferably ranges from 5 minutes to 40 minutes, and the molding pressure preferably ranges from 0.1 MPa to 100 MPa.

Examples of the shape of the golf club grip include a shape having a cylindrical portion for inserting a shaft and an integrally molded cap portion for covering the opening of the back end of the cylindrical portion, wherein the cylindrical portion is formed from the first rubber composition. Further, the cylindrical portion preferably has a layered construction composed of the inner layer and the outer layer. In this case, the outer layer is formed from the first rubber composition.

The cylindrical portion may be formed with a fixed thickness along the axis direction thereof, or may be formed with a thickness gradually becoming thicker from the front end toward the back end. In addition, the cylindrical portion may be formed with a fixed thickness along the diameter direction thereof, or a projecting strip part (so-called back line) may be formed on a part of the cylindrical portion. Furthermore, a groove may be formed on the surface of the cylindrical portion. Formation of a water film between the hand of the golfer and the grip may be suppressed by the groove, and thus the grip performance under a wet condition is further enhanced. In addition, in view of the anti-slipping performance and abrasion resistance of the grip, a reinforcing cord may be disposed in the grip.

The mass of the golf club grip is preferably 16 g or more, more preferably 18 g or more, and even more preferably 20 g or more, and is preferably 35 g or less, more preferably 32 g or less, and even more preferably 30 g or less.

[Golf Club]

The present invention also provides a golf club using the above golf club grip. The golf club comprises a shaft, a head provided on one end of the shaft, and a grip provided on another end of the shaft, wherein the grip is the above-described golf club grip. The shaft can be made of stainless steel or a carbon fiber reinforced resin. Examples of the head include a wood type, utility type, and iron type. The material constituting the head is not particularly limited, and examples thereof include titanium, titanium alloy, carbon fiber reinforced plastic, stainless steel, maraging steel, and soft iron.

Figure 9:
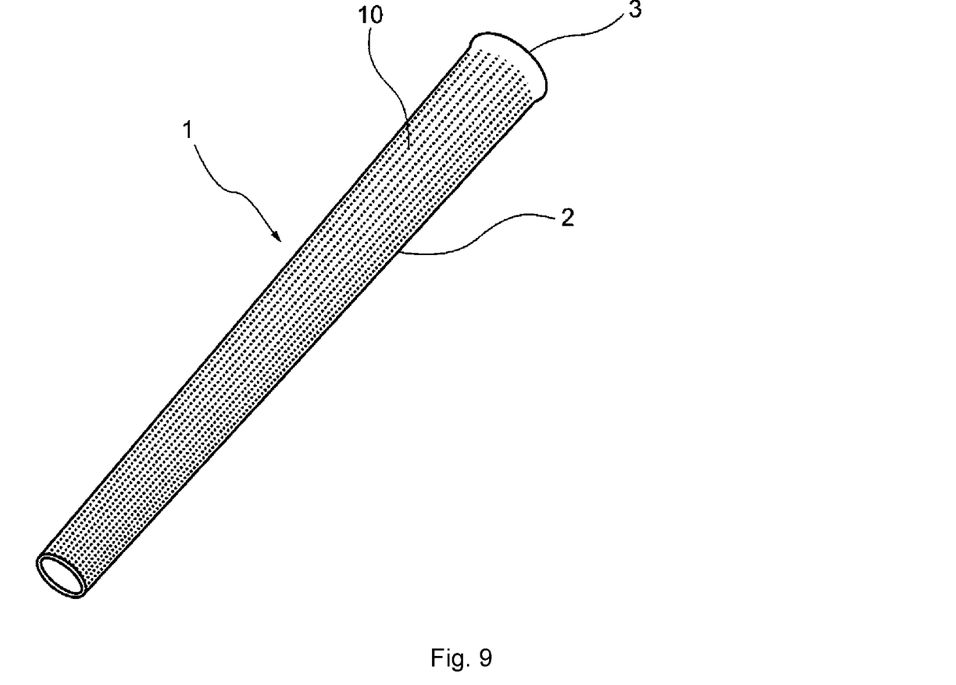
FIG. 9 is a perspective view showing one example of a golf club grip.

Next, the golf club grip and the golf club will be explained with reference to figures. FIG. 9 is a perspective view showing one example of a golf club grip. A grip 1 comprises a cylindrical portion 2 for inserting a shaft, and an integrally molded cap portion 3 for covering the opening of the back end of the cylindrical portion.

Figure 10:
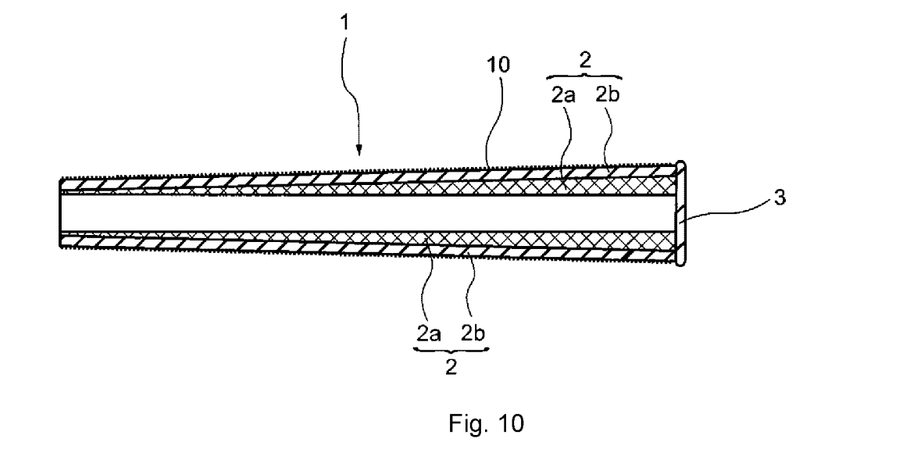
FIG. 10 is a schematic cross-sectional view showing one example of a golf club grip.
Figure 11:
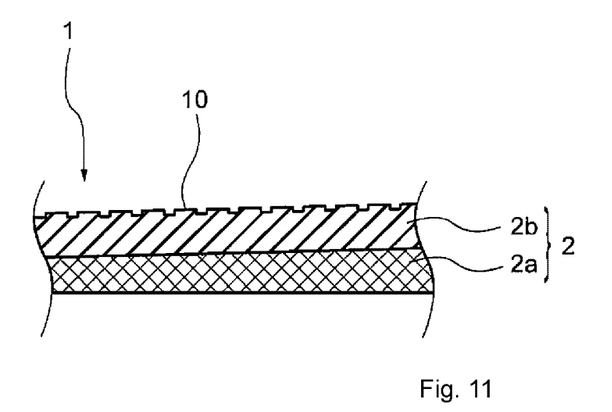
FIG. 11 is an enlarged schematic cross-sectional view of the golf club grip shown in FIG. 10.

FIG. 10 is a schematic cross-sectional view showing one example of a golf club grip. The cylindrical portion 2 is composed of an inner layer 2*a* and an outer layer 2*b*. The outer layer 2*b* is formed with a uniform thickness throughout the entire region from the front end to the back end. The inner layer 2*a* is formed with a thickness gradually becoming thicker from the front end toward the back end. In the grip 1 shown in FIG. 10, the cap portion 3 is formed from the same rubber composition as that used in the outer layer 2*b*. FIG. 11 is an enlarged schematic cross-sectional view of the golf club grip 1 shown in FIG. 10. As shown in FIG. 11, the cylindrical portion 2 has minute projections 10 on a surface of the outer layer 2*b*.

Figure 12:
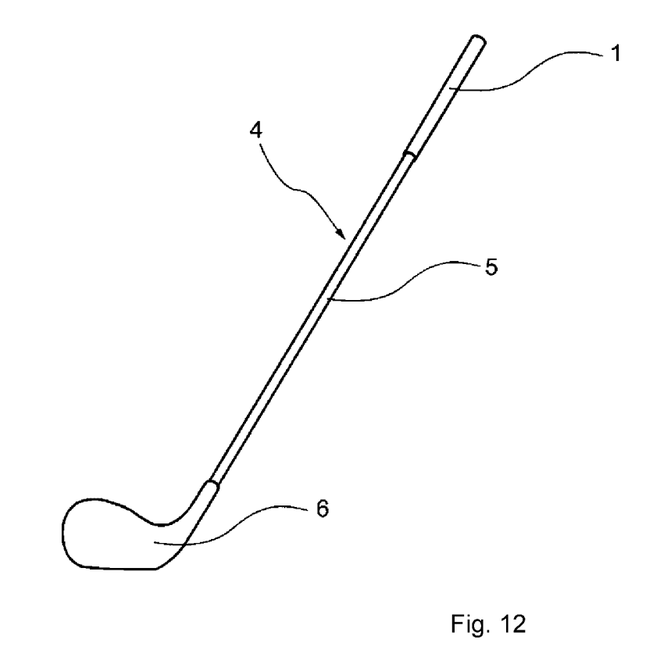
FIG. 12 is a perspective view showing one example of a golf club.

FIG. 12 is a perspective view showing one example of the golf club according to the present invention. A golf club 4 comprises a shaft 5, a head 6 provided on one end of the shaft 5, and a grip 1 provided on another end of the shaft 5. The back end of the shaft 5 is inserted into the cylindrical portion 2 of the grip 1.

EXAMPLES

Next, the present invention will be described in detail by way of examples. However, the present invention is not limited to the examples described below. Various changes and modifications without departing from the spirit of the present invention can be made and are all included in the scope of the present invention.

[Evaluation Method]

(1) Material Hardness (Shore A Hardness)

Sheets with a thickness of 2 mm were prepared by pressing the rubber composition at 160° C. for 8 to 20 minutes. It is noted that, in the case that the rubber composition contains the microballoons, the sheets were prepared by expanding the microballoons at the same foaming ratio as that when forming the grip. These sheets were stored at 23° C. for two weeks. Three of these sheets were stacked on one another so as not to be affected by the measuring base on which the sheets were placed, and the hardness of the stack was measured with an automatic hardness tester (Digitest II, available from Bareiss company) using a testing device of "Shore A".

(2) Measurement of Dynamic Coefficient of Friction

Figure 13:
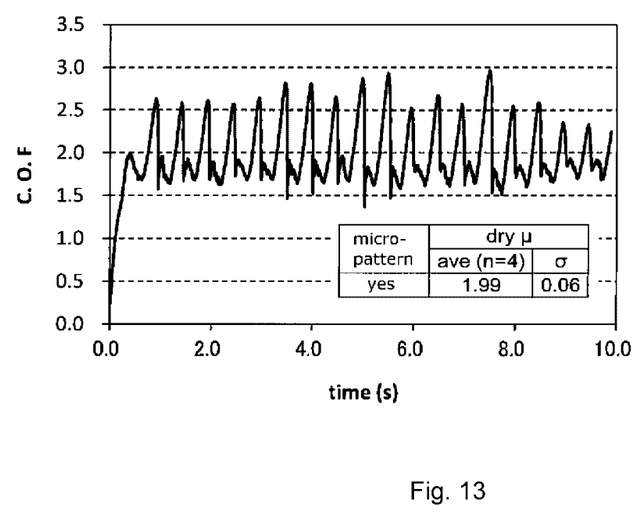
FIG. 13 is a figure showing a dynamic coefficient of friction measurement result of the grip No. 1.
Figure 14:
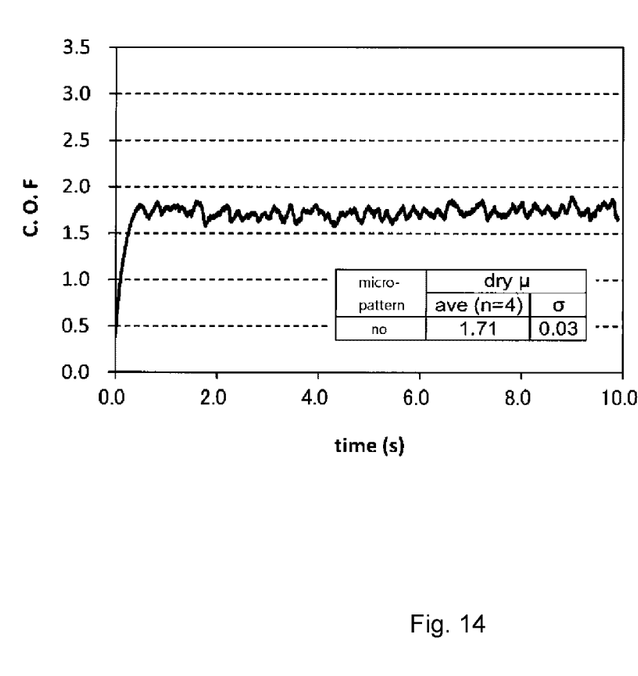
FIG. 14 is a figure showing a dynamic coefficient of friction measurement result of the grip No. 11.

The dynamic coefficient of friction was measured by using a static & dynamic friction tester (TL201Ts available from Trinity-Lab inc.). Specifically, a rubber sheet (2 cm in width and 6 cm in length) was cut from the golf club grip and used as a test piece. The rubber sheet was cut from the region where the projection is formed of the grip. Regarding the grip No. 11, it is noted that the rubber sheet was cut from the central part of the grip in the axis direction since no minute projection is formed on the grip. The test piece was fixed on a moving table of the apparatus, and the dynamic friction of the test piece was measured by using a tactile contactor on which a geometry fingerprint pattern was provided. The test was carried on at a moving distance of 1 cm, a moving speed of 1 mm/sec and a load of 25 g. The dynamic coefficient of friction was calculated by adopting the position where the friction movement was started as 0 cm and averaging the dynamic coefficients of friction obtained at a moving distance between 0.35 cm and 0.65 cm. It is noted that the dynamic coefficient of friction of the grip No. 11 is defined as an index of 100, and the dynamic coefficient of friction is a value represented by converting the dynamic coefficient of friction of each grip into this index. Further, measurement results of the dynamic coefficient of friction of the grips No. 1 and 11 are shown in FIGS. 13 and 14.

(3) tan δ Peak

The tan δ was measured with a dynamic viscoelasticity measuring apparatus (Rheogel-E4000 available from UBM Corporation). A test sample was prepared by pressing the outer layer rubber composition at 160° C. to prepare a rubber plate, and punching this rubber plate into a given size. The measuring conditions were set as follows: temperature range: −100° C. to 100° C., temperature rising rate: 3° C./min, measuring interval: 3° C., frequency: 10 Hz, jig: stretching, and sample shape: 4 mm in width, 1 mm in thickness and 40 mm in length. The tan δ peak temperature (glass transition point) was calculated based on the obtained viscoelasticity spectrum by the dynamic viscoelasticity measurement.

(4) Head Speed

A grip of a golf club (driver) (XX108 (Flex: S) available from Dunlop Sports Limited) was replaced with the test grip to prepare a test golf club. The test golf club was used by ten golfers to perform an actual hitting evaluation, and the head speed thereof was measured. The head speed was measured with a measurement system disclosed in Japanese Patent Publication No. 2012-170532 A, and the average value of the ten golfers was calculated. It is noted that the head speed is shown as a difference from the head speed of the grip No. 11.

(5) Cold Endurance Test

The grip was provided on a shaft to prepare a golf club, and the golf club was stored at 0° C. overnight. The golf club stored at 0° C. and a golf club stored at normal temperature were used by ten golfers to perform an actual hitting evaluation. If a difference was found between the golf club stored at 0° C. and the golf club stored at normal temperature, the golf club was graded as "P", and if no difference was found between the golf club stored at 0° C. and the golf club stored at normal temperature, the golf club was graded as "G". The final statistic was performed as follows.

G(Good): The number of golfers who judged that no difference was found is at least 8.

P(Poor): The number of golfers who judged that a difference was found is more than 2.

[Preparation of Grip Composition]

According to the formulations shown in Tables 1-2, raw materials were kneaded to prepare the outer layer rubber compositions and the inner layer rubber compositions. It is noted that, the outer layer rubber compositions were prepared by kneading all the raw materials with a banbury mixer, and the inner layer rubber compositions were prepared by kneading the raw materials other than the microballoons with a banbury mixer followed by blending the microballoons therein with a roll. The material temperature when kneading the inner layer rubber compositions with the banbury mixer and the material temperature when blending the microballoons with the roll were lower than the expansion starting temperature of the microballoons.

TABLE 1

|  |  |  | Outer layer rubber composition No. | | |
|---|---|---|---|---|---|
|  |  |  | A | B | C |
| Formulation (parts by mass) | Base rubber | NR | 70 | — | — |
|  |  | EPDM | 30 | — | — |
|  |  | IIR | 5 | — | — |
|  |  | HXNBR | — | 100 | — |
|  |  | HNBR | — | — | 100 |
|  | Reinforcing material | DIABLACK N220 | 4 | 5 | 5 |
|  |  | ULTRASIL VN3 GR | 8 | — | — |
|  | Crosslinking agent | Sulfur | 2.0 | 1.5 | 1.5 |
|  | Vulcanization accelerator | NOCCELER NS | 1 | — | — |
|  |  | NOCCELER CZ | 1 | — | — |
|  |  | SOXINOL D | 1 | — | — |
|  |  | Sanceler TBzTD | — | 3 | 3 |
|  | Vulcanization activator | Zinc oxide | 3 | — | 5 |
|  |  | STRUKTOL ZP 1014 | — | 5 | — |
|  | Antioxidant | NOCRAC NS-6 | 0.5 | — | — |
|  |  | NOCRAC TBTU | — | 1 | 1 |
|  | Processing aid and modifier | Stearic acid | 1 | — | — |
|  |  | PW380 | 2 | — | — |
|  |  | HARITACK SE10 | — | 8 | 8 |
|  |  | sylvatac RE 5S | — | 8 | 8 |

TABLE 2

|  |  |  | Inner layer rubber composition No. | |
|---|---|---|---|---|
|  |  |  | a | b |
| Formulation (parts by mass) | Base rubber | NR | 70 | — |
|  |  | EPDM | 30 | — |
|  |  | IIR | 5 | — |
|  |  | HNBR | — | 100 |

TABLE 2-continued

| | | Inner layer rubber composition No. | |
|---|---|---|---|
| | | a | b |
| Reinforcing material | DIABLACK N220 | 4 | — |
| | ULTRASIL VN3 GR | 8 | — |
| | SEAST SO | — | 5 |
| Crosslinking agent | Sulfur | 2.0 | 1.5 |
| Vulcanization accelerator | NOCCELER NS | 1 | — |
| | NOCCELER CZ | 1 | — |
| | SOXINOL D | 1 | — |
| | Sanceler TBzTD | — | 3 |
| Vulcanization activator | Zinc oxide | 3 | — |
| | STRUKTOL ZP 1014 | — | 5 |
| Antioxidant | NOCRAC NS-6 | 0.5 | — |
| Retarder | SANTOGARD PVI | 0.5 | 0.5 |
| | Benzoic acid | 0.3 | — |
| Processing aid and modifier | Stearic acid | 1 | — |
| | PW380 | 2 | — |
| | Koresin | — | 10 |
| Foaming agent | Microballoons | 12 | 10 |

Materials used in Tables 1-2 are shown below.
NR (natural rubber): TSR20
EPDM (ethylene-propylene-diene rubber): ESPRENE (registered trademark) 505A available from Sumitomo Chemical Co., Ltd.
IIR: JSR BUTYL065 available from JSR Corporation
HXNBR: hydrogenated carboxyl-modified acrylonitrile-butadiene rubber (Therban XT VPKA 8889 available from Lanxess Corporation)
HNBR: hydrogenated acrylonitrile-butadiene rubber (Therban LT2057 available from Lanxess Corporation)
DIABLACK (registered trademark) N220: carbon black (DBP absorption amount: 115 $cm^3$/100 g) available from Mitsubishi Chemical Co., Ltd.
ULTRASIL VN3 GR: granulated silica (amorphous) (DBP absorption amount: 200 $cm^3$/100 g to 240 $cm^3$/100 g) available from Evonik Co., Ltd.
SEAST (registered trademark) SO: carbon black (DBP absorption amount: 115 $cm^3$/100 g) available from Tokai Carbon Co., Ltd.
Sulfur: 5% oil treated sulfur fine powder (200 mesh) available from Tsurumi Chemical Industry Co., Ltd.
NOCCELER NS: N-t-butyl-2-benzothiazolylsulfenamide available from Ouchi Shinko Chemical Industry Co., Ltd.
NOCCELER CZ: N-cyclohexyl-2-benzothiazolylsulfenamide available from Ouchi Shinko Chemical Industry Co., Ltd.
SOXINOL D: 1,3-diphenyl guanidine available from Sumitomo Chemical Co., Ltd.
Sanceler (registered trademark) TBzTD: tetrabenzylthiuram disulfide available from Sanshin Chemical Industry Co., Ltd.
Zinc oxide: WHITE SEAL available from PT. INDO LYSAGHT Company STRUKTOL ZP 1014: a product containing zinc peroxide in an amount of 29 mass % available from Struktol Company
NOCRAC (registered trademark) NS-6: 2,2'-methylene bis(4-methyl-6-t-butylphenol) available from Ouchi Shinko Chemical Industry Co., Ltd.
NOCRAC TBTU: tributyl thiourea available from Ouchi Shinko Chemical Industry Co., Ltd.
SANTOGARD PVI: N-cyclohexyl thiophthalimide available from Sanshin Chemical Industry Co., Ltd.
Benzoic acid: available from Sigma-Aldrich Corporation
Stearic acid: beads stearic acid camellia available from NOF Co., Ltd.
PW380: Diana Process Oil PW380 available from Idemitsu Kosan Co., Ltd.
HARITACK SE10: hydrogenated rosin ester (softening point: 78° C. to 87° C., acid value: 2 mgKOH/g to 10 mgKOH/g) available from Harima Chemicals Group, Inc.
Sylvatac RE5S: available from Arizona Chemical Co., Ltd.
Koresin (registered trademark): butylphenol-acetylene condensate (softening point: 135° C. to 150° C.) available from BASF Ltd.
Microballoons: "Expancel (registered trademark) 909-80DU" (resin capsules encapsulating a hydrocarbon having a low boiling point in a shell formed from a thermoplastic resin, volume average particle size: 18 μm to 24 μm, expansion starting temperature: 120° C. to 130° C.) available from Akzo Nobel Company The unvulcanized outer layer rubber sheet having a fan shape and the cap member were prepared from the outer layer rubber composition. It is noted that the outer layer rubber sheet was formed with a fixed thickness. The unvulcanized inner layer rubber sheet having a rectangular shape was prepared from the inner layer rubber composition. It is noted that the inner layer rubber sheet was formed with a thickness gradually becoming thicker from one end toward another end. The inner layer rubber sheet was wound around a mandrel, an adhesive composition was applied thereto, and then the outer layer rubber sheet was laminated and wound around thereon. The mandrel provided with these wound rubber sheets, and the cap member were charged into a mold. Then, a heat treatment was carried out at a mold temperature of 160° C. for a heating time of 15 minutes to obtain the grips not having minute projections on the surface of the outer layer thereof. In the obtained grips not having minute projections, the cylindrical portion had a thickness of 1.5 mm at the thinnest part (the end on the head side), and a thickness of 6.7 mm at the thickest part (the end on the grip end side).

A laser processing machine (Fiber laser processing machine "ML-7320DL" available from Amada Miyachi Co., Ltd.) was used to form minute projections on the above-obtained grips not having minute projections. The minute projections were formed along the entire circumferential direction in a region having a distance of 10% to 60% of the total length from the tip side end along the axis direction.

Evaluation results for each grip are shown in Table 3 and 4.

TABLE 3

| | | Grip No. | | | | |
|---|---|---|---|---|---|---|
| | | 1 | 2 | 3 | 4 | 5 |
| Outer layer | Rubber composition No. | A | A | A | A | A |
| | Material hardness (Shore A) | 53 | 53 | 53 | 53 | 53 |
| | Type | Solid | Solid | Solid | Solid | Solid |
| | Thickness (mm) | 0.2 | 0.2 | 0.2 | 0.2 | 0.2 |

TABLE 3-continued

| | | | | | | |
|---|---|---|---|---|---|---|
| Inner layer | Rubber composition No. | a | a | a | a | a |
| | Material hardness (Shore A) | 26 | 26 | 26 | 26 | 26 |
| | Type | Foamed | Foamed | Foamed | Foamed | Foamed |
| | Foaming ratio | 3.3 | 3.3 | 3.3 | 3.3 | 3.3 |
| Minute projection existence region | Minute projections | Yes | Yes | Yes | Yes | Yes |
| | Plane view shape of bottom | Square | Square | Square | Square | Square |
| | Three-dimensional shape | Quadrangular truncated pyramid | Quadrangular truncated pyramid | Quadrangular truncated pyramid | Quadrangular truncated pyramid | Quadrangular truncated pyramid |
| | Height h (mm) | 0.11 | 0.11 | 0.11 | 0.11 | 0.07 |
| | Minimum width w1 of bottom (mm) | 0.5 | 0.2 | 0.6 | 0.7 | 0.5 |
| | Maximum width w2 of bottom (mm) | 0.71 | 0.28 | 0.85 | 0.99 | 0.71 |
| | Minimum width w3 (mm) of upper base | 0.3 | 0.1 | 0.5 | 0.6 | 0.3 |
| | Ratio (h/w1) | 0.22 | 0.55 | 0.18 | 0.16 | 0.14 |
| | Ratio (w2/w1) | 1.4 | 1.4 | 1.4 | 1.4 | 1.4 |
| | Ratio (w3/w1) | 0.6 | 0.5 | 0.8 | 0.9 | 0.6 |
| | Number per cm$^2$ | 400 | 2500 | 278 | 204 | 400 |
| Evaluation results | tan δ peak temperature (° C.) | −40 | −40 | −40 | −40 | −40 |
| | Weight (g) | 23 | 23 | 23 | 23 | 23 |
| | Dynamic coefficient of friction | 117 | 114 | 116 | 115 | 113 |
| | Head speed (m/s) | 0.4 | 0.4 | 0.4 | 0.4 | 0.3 |
| | Cold endurance test | G | G | G | G | G |

| | | Grip No. | | | | |
|---|---|---|---|---|---|---|
| | | 6 | 7 | 8 | 9 | 10 |
| Outer layer | Rubber composition No. | A | A | A | A | None |
| | Material hardness (Shore A) | 53 | 53 | 53 | 53 | |
| | Type | Solid | Solid | Solid | Solid | |
| | Thickness (mm) | 0.2 | 0.2 | 0.2 | 0.2 | |
| Inner layer | Rubber composition No. | a | a | a | a | A |
| | Material hardness (Shore A) | 26 | 26 | 26 | 26 | 53 |
| | Type | Foamed | Foamed | Foamed | Foamed | Solid |
| | Foaming ratio | 3.3 | 3.3 | 3.3 | 3.3 | 1 |
| Minute projection existence region | Minute projections | Yes | Yes | Yes | Yes | Yes |
| | Plane view shape of bottom | Square | Square | Square | Square | Square |
| | Three-dimensional shape | Quadrangular truncated pyramid | Quadrangular truncated pyramid | Quadrangular truncated pyramid | Quadrangular truncated pyramid | Quadrangular truncated pyramid |
| | Height h (mm) | 0.15 | 0.2 | 0.6 | 1.2 | 0.11 |
| | Minimum width w1 of bottom (mm) | 0.5 | 0.5 | 0.6 | 0.8 | 0.5 |
| | Maximum width w2 of bottom (mm) | 0.71 | 0.71 | 0.85 | 1.13 | 0.71 |
| | Minimum width w3 (mm) of upper base | 0.3 | 0.3 | 0.3 | 0.3 | 0.3 |
| | Ratio (h/w1) | 0.30 | 0.40 | 1.00 | 1.50 | 0.22 |
| | Ratio (w2/w1) | 1.4 | 1.4 | 1.4 | 1.4 | 1.4 |
| | Ratio (w3/w1) | 0.6 | 0.6 | 0.5 | 0.38 | 0.6 |
| | Number per cm$^2$ | 400 | 400 | 278 | 156 | 400 |
| Evaluation results | tan δ peak temperature (° C.) | −40 | −40 | −40 | −40 | −40 |
| | Weight (g) | 23 | 23 | 23 | 23 | 38 |
| | Dynamic coefficient of friction | 120 | 115 | 118 | 115 | 120 |
| | Head speed (m/s) | 0.5 | 0.4 | 0.4 | 0.3 | 0.5 |
| | Cold endurance test | G | G | G | G | G |

TABLE 4

| | | Grip No. | | | | | |
|---|---|---|---|---|---|---|---|
| | | 11 | 12 | 13 | 14 | 15 | 16 |
| Outer layer | Rubber composition No. | A | A | A | A | B | C |
| | Material hardness (Shore A) | 53 | 53 | 53 | 53 | 49 | 50 |
| | Type | Solid | Solid | Solid | Solid | Solid | Solid |
| | Thickness (mm) | 0.2 | 0.2 | 0.2 | 0.2 | 0.2 | 0.2 |
| Inner layer | Rubber composition No. | a | a | a | a | b | b |
| | Material hardness (Shore A) | 26 | 26 | 26 | 26 | 39 | 39 |
| | Type | Foamed | Foamed | Foamed | Foamed | Foamed | Foamed |
| | Foaming ratio | 3.3 | 3.3 | 3.3 | 3.3 | 3.3 | 3.3 |
| Minute projections existence region | Minute projections | No | Yes | Yes | Yes | Yes | Yes |
| | Plane view shape of bottom | — | Square | Square | Square | Square | Square |
| | Three-dimensional shape | — | Quadrangular truncated pyramid | Quadrangular truncated pyramid | Quadrangular truncated pyramid | Quadrangular truncated pyramid | Quadrangular truncated pyramid |
| | Height h (mm) | — | 0.04 | 0.11 | 0.11 | 0.11 | 0.11 |
| | Minimum width w1 of bottom (mm) | — | 0.5 | 1.0 | 0.1 | 0.5 | 0.5 |
| | Maximum width w2 of bottom (mm) | — | 0.71 | 1.41 | 0.14 | 0.71 | 0.71 |
| | Minimum width w3 of upper base (mm) | — | 0.3 | 0.9 | 0.05 | 0.3 | 0.3 |

TABLE 4-continued

| | | Grip No. | | | | | |
|---|---|---|---|---|---|---|---|
| | | 11 | 12 | 13 | 14 | 15 | 16 |
| | Ratio (h/w1) | — | 0.22 | 0.05 | 0.50 | 0.22 | 0.22 |
| | Ratio (w2/w1) | — | 1.4 | 1.4 | 1.4 | 1.4 | 1.4 |
| | Ratio (w3/w1) | — | 0.6 | 0.9 | 0.5 | 0.6 | 0.6 |
| | Number per cm$^2$ | — | 400 | 100 | 10000 | 400 | 400 |
| Evaluation results | tan δ peak temperature (° C.) | −40 | −40 | −40 | −40 | −1.3 | −13 |
| | Weight (g) | 23 | 23 | 23 | 23 | 23 | 23 |
| | Dynamic coefficient of friction | 100 | 100 | 101 | 102 | 118 | 121 |
| | Head speed (m/s) | 0.0 | 0.0 | 0.0 | 0.1 | 0.1 | 0.1 |
| | Cold endurance test | G | G | G | G | P | G |

The grips No. 1 to 10 are the cases that the cylindrical portion thereof is formed from a rubber composition containing a base rubber including a nonpolar rubber in an amount of 50 mass % or more, and has an outer layer on which minute projections are formed. These grips No. 1 to 10 have a great dynamic coefficient of friction and excellent anti-slipping performance. These grips improved the head speed. In addition, these grips No. 1 to 10 primarily contain a natural rubber as the base rubber, and thus they have excellent anti-slipping performance even under a cold condition.

The grip No. 11 is the case that the outer layer thereof does not have minute projections. The grip No. 12 is the case that the height of the projections is excessively short, the grip No. 13 is the case that the minimum width of the projections is excessively wide, and the grip No. 14 is the case that the minimum width of the projections is excessively narrow. These grips No. 11 to 14 have poor anti-slipping performance, and failed to improve the head speed.

The grips No. 15 and 16 are the cases that the cylindrical portion thereof is formed from a rubber composition containing a base rubber including a polar rubber in an amount of 50 mass % or more. Although these grips No. 15 and 16 have a great dynamic coefficient of friction, the grips No. 15 and 16 failed to improve the head speed. It is considered that this is because the anti-slipping performance of the grip surface is lowered by the user's sebum attached to the minute projections, and the force that the user held the grip was strong.

This application is based on Japanese patent application No. 2017-211096 filed on Oct. 31, 2017, the content of which is hereby incorporated by reference.

The invention claimed is:

1. A golf club grip comprising a cylindrical portion for inserting a shaft, wherein
   the cylindrical portion is formed from a rubber composition containing a base rubber and a crosslinking agent,
   the base rubber contains a nonpolar rubber in an amount of 50 mass % or more, and
   the cylindrical portion has a surface on which is formed a plurality of minute projections having a height (h) of 0.07 mm or more and a minimum width (w1) at the bottom of the projections in a range from 0.2 mm to 0.8 mm, and
   wherein the minute projections have a three-dimensional shape that is a frustum, and a ratio (w3/w1) of a minimum width (w3) of an upper base to a minimum width (w1) of a lower base ranges from 0.3 to 1.0.

2. The golf club grip according to claim 1, wherein the cylindrical portion comprises a minute projection existence region where the minute projections exist in an amount of 150/1 cm$^2$ to 2500/1 cm$^2$.

3. The golf club grip according to claim 1, wherein the minute projections have a ratio (h/w1) of the height (h) thereof to the minimum width (w1) of the bottom thereof in a range from 0.1 to 1.5.

4. The golf club grip according to claim 1, wherein the nonpolar rubber is at least one member selected from the group consisting of an isoprene rubber, a butadiene rubber, a styrene-butadiene rubber, a chloroprene rubber, a natural rubber, an ethylene-propylene rubber, an ethylene-propylene-diene rubber and a butyl rubber.

5. The gold club strip according to claim 1, wherein the rubber composition contains at least one oil absorbent selected from the group consisting of carbon black having a DBP absorption amount in a range from 50 cm$^3$/100 g to 150 cm$^3$/100 g, silica having a DBP absorption amount in a range from 100 cm$^3$/100 g to 400 cm$^3$/100 g, titanium oxide having a DBP absorption amount in a range from 10 cm$^3$/100 g to 30 cm$^3$/100 g and calcined kaolin having a DBP absorption amount in a range from 50 cm$^3$/100 g to 100 cm$^3$/100 g.

6. The golf club grip according to claim 5, wherein the rubber composition contains the oil absorbent in an amount ranging from 4 parts by mass to 20 parts by mass with respect to 100 parts by mass of the base rubber.

7. The golf club grip according to claim 1, wherein the base rubber consists of the nonpolar rubber.

8. The golf club grip according to claim 1, wherein the rubber composition has a material hardness in a range from 40 to 60 in Shore A hardness.

9. A golf club comprising a shaft, a head provided on one end of the shaft, and a grip provided on another end of the shaft, wherein
   the grip is a golf club grip comprising a cylindrical portion for inserting a shaft,
   the cylindrical portion is formed from a rubber composition containing a base rubber and a crosslinking agent,
   the base rubber contains a nonpolar rubber in an amount of 50 mass % or more, and
   the cylindrical portion has a surface on which is formed a plurality of minute projections having a height (h) of 0.07 mm or more and a minimum width (w1) at the bottom of the projection in a range from 0.2 mm to 0.8 mm, and
   wherein the minute projections have a three-dimensional shape that is a frustum, and a ratio (w3/w1) of a minimum width (w3) of an upper base to a minimum width (w1) of a lower base ranges from 0.3 to 1.0.

10. The golf club according to claim 9, wherein the cylindrical portion comprises a minute projection existence region where the minute projections exist in an amount of 150/1 cm$^2$ to 2500/1 cm$^2$.

11. The golf club according to claim 9, wherein the minute projections have a ratio (h/w1) of the height (h) thereof to the minimum width (w1) at the bottom thereof in a range from 0.1 to 1.5.

12. The golf club according to claim 9, wherein the nonpolar rubber is at least one member selected from the group consisting of an isoprene rubber, a butadiene rubber, a styrene-butadiene rubber, a chloroprene rubber, a natural rubber, an ethylene-propylene rubber, an ethylene-propylene-diene rubber and a butyl rubber.

13. The golf club according to claim 9, wherein the rubber composition contains at least one oil absorbent selected from the group consisting of carbon black having a DBP absorption amount in a range from 50 $cm^3/100$ g to 150 $cm^3/100$ g, silica having a DBP absorption amount in a range from 100 $cm^3/100$ g to 400 $cm^3/100$ g, titanium oxide having a DBP absorption amount in a range from 10 $cm^3/100$ g to 30 $cm^3/100$ g and calcined kaolin having a DBP absorption amount in a range from 50 $cm^3/100$ g to 100 $cm^3/100$ g.

14. The golf club according to claim 13, wherein the rubber composition contains the oil absorbent in an amount ranging from 4 parts by mass to 20 parts by mass with respect to 100 parts by mass of the base rubber.

15. The golf club according to claim 9, wherein the base rubber consists of the nonpolar rubber.

16. The golf club according to claim 9, wherein the rubber composition has a material hardness in a range from 40 to 60 in Shore A hardness.

17. A golf club grip comprising a cylindrical portion for inserting a shaft, wherein
the cylindrical portion is formed from a rubber composition containing a base rubber and a crosslinking agent,
the base rubber contains a nonpolar rubber in an amount of 50 mass % or more,
the rubber composition contains at least one oil absorbent selected from the group consisting of carbon black having a DBP absorption amount in a range from 50 $cm^3/100$ g to 150 $cm^3/100$ g, silica having a DBP absorption amount in a range from 100 $cm^3/100$ g to 400 $cm^3/100$ g, titanium oxide having a DBP absorption amount in a range from 10 $cm^3/100$ g to 30 $cm^3/100$ g and calcined kaolin having a DBP absorption amount in a range from 50 $cm^3/100$ g to 100 $cm^3/100$ g, and
the cylindrical portion has a surface on which is formed a plurality of minute projections having a height (h) of 0.07 mm or more and a minimum width (w1) at the bottom of the projection in a range from 0.2 mm to 0.8 mm.

18. The golf club grip according to claim 17, wherein the cylindrical portion comprises a minute projection existence region where the minute projections exist in an amount of 150/1 $cm^2$ to 2500/1 $cm^2$.

19. The golf club grip according to claim 17, wherein the minute projections have a ratio (h/w1) of the height (h) thereof to the minimum width (w1) of the bottom thereof in a range from 0.1 to 1.5.

20. The golf club grip according to claim 17, wherein the nonpolar rubber is at least one member selected from the group consisting of an isoprene rubber, a butadiene rubber, a styrene-butadiene rubber, a chloroprene rubber, a natural rubber, an ethylene-propylene rubber, an ethylene-propylene-diene rubber and a butyl rubber.

21. The golf club grip according to claim 17, wherein the rubber composition contains the oil absorbent in an amount ranging from 4 parts by mass to 20 parts by mass with respect to 100 parts by mass of the base rubber.

22. The golf club grip according to claim 17, wherein the base rubber consists of the nonpolar rubber.

23. The golf club grip according to claim 17, wherein the rubber composition has a material hardness in a range from 40 to 60 in Shore A hardness.

24. A golf club comprising a shaft, a head provided on one end of the shaft, and a grip provided on another end of the shaft, wherein
the grip is a golf club grip comprising a cylindrical portion for inserting a shaft,
the cylindrical portion is formed from a rubber composition containing a base rubber and a crosslinking agent,
the base rubber contains a nonpolar rubber in an amount of 50 mass % or more,
the rubber composition contains at least one oil absorbent selected from the group consisting of carbon black having a DBP absorption amount in a range from 50 $cm^3/100$ g to 150 $cm^3/100$ g, silica having a DBP absorption amount in a range from 100 $cm^3/100$ g to 400 $cm^3/100$ g, titanium oxide having a DBP absorption amount in a range from 10 $cm^3/100$ g to 30 $cm^3/100$ g and calcined kaolin having a DBP absorption amount in a range from 50 $cm^3/100$ g to 100 $cm^3/100$ g, and
the cylindrical portion has a surface on which is formed a plurality of minute projections having a height (h) of 0.07 mm or more and a minimum width (w1) at the bottom of the projection in a range from 0.2 mm to 0.8 mm.

25. The golf club according to claim 24, wherein the cylindrical portion comprises a minute projection existence region where the minute projections exist in an amount of 150/1 $cm^2$ to 2500/1 $cm^2$.

26. The golf club according to claim 24, wherein the minute projections have a ratio (h/w1) of the height (h) thereof to the minimum width (w1) at the bottom thereof in a range from 0.1 to 1.5.

27. The golf club according to claim 24, wherein the nonpolar rubber is at least one member selected from the group consisting of an isoprene rubber, a butadiene rubber, a styrene-butadiene rubber, a chloroprene rubber, a natural rubber, an ethylene-propylene rubber, an ethylene-propylene-diene rubber and a butyl rubber.

28. The golf club according to claim 24, wherein the rubber composition contains the oil absorbent in an amount ranging from 4 parts by mass to 20 parts by mass with respect to 100 parts by mass of the base rubber.

29. The golf club according to claim 24, wherein the base rubber consists of the nonpolar rubber.

30. The golf club according to claim 24, wherein the rubber composition has a material hardness in a range from 40 to 60 in Shore A hardness.

* * * * *